United States Patent
Keller

(10) Patent No.: US 7,448,187 B2
(45) Date of Patent: Nov. 11, 2008

(54) INSTALLATION FOR PRODUCING AND PACKING TUBES

(75) Inventor: Gerhard Keller, Jongny (CH)

(73) Assignee: Aisa Automation Industrielle SA, Vouvry (CH)

(*) Notice: Subject to any disclaimer, the term of this patent is extended or adjusted under 35 U.S.C. 154(b) by 378 days.

(21) Appl. No.: 10/524,943

(22) PCT Filed: Jul. 31, 2003

(86) PCT No.: PCT/EP03/08481

§ 371 (c)(1),
(2), (4) Date: Dec. 22, 2005

(87) PCT Pub. No.: WO2004/026567

PCT Pub. Date: Apr. 1, 2004

(65) Prior Publication Data

US 2006/0105077 A1     May 18, 2006

(30) Foreign Application Priority Data

Aug. 19, 2002   (DE)   ................ 102 37 839

(51) Int. Cl.
*B65B 35/30* (2006.01)
*B31C 1/06* (2006.01)

(52) U.S. Cl. ............ 53/539; 53/246; 493/288; 493/297

(58) Field of Classification Search ............ 53/133.1, 53/133.2, 244, 246, 539, 540, 561; 493/87, 493/288, 297, 298, 305, 306, 308
See application file for complete search history.

(56) References Cited

U.S. PATENT DOCUMENTS

| | | | | |
|---|---|---|---|---|
| 2,383,230 A | * | 8/1945 | Voke | ............ 493/87 |
| 2,923,975 A | * | 2/1960 | Voumard et al. | ..... 264/DIG. 41 |
| 3,047,910 A | * | 8/1962 | Downs | ............... 264/DIG. 41 |
| 3,540,959 A | * | 11/1970 | Connor | ................ 493/297 |
| 3,764,425 A | * | 10/1973 | Neff et al. | ............. 493/297 |
| 3,778,321 A | * | 12/1973 | Abbott | ................ 493/157 |
| 3,805,476 A | * | 4/1974 | Kawamura et al. | ............ 53/539 |
| 3,896,710 A | | 7/1975 | Holoubek et al. | |
| 3,986,636 A | * | 10/1976 | Hoppmann et al. | ............ 53/246 |
| 4,079,664 A | * | 3/1978 | Jones | ................ 493/156 |
| 4,123,312 A | * | 10/1978 | Schmid et al. | ............. 493/288 |
| 5,310,300 A | * | 5/1994 | Crabb et al. | ................ 53/539 |
| 5,621,960 A | * | 4/1997 | Kaminski | ................ 53/561 |
| 6,047,525 A | | 4/2000 | Kieras et al. | |
| 7,037,456 B2 | * | 5/2006 | Gruau et al. | ................ 264/248 |

FOREIGN PATENT DOCUMENTS

DE     110 833     5/1900

* cited by examiner

*Primary Examiner*—Louis K Huynh
(74) *Attorney, Agent, or Firm*—Collard & Roe, P.C.

(57) ABSTRACT

A plant for manufacturing and packaging tubes feeds the tubes via a conveyor belt to a packaging station, where they are packaged to form larger units. The foil strip is a dual or multiple-strip, cut by at least one partitioning blade into individual webs respectively welded in parallel planes to form endless tubes and cut by transverse cutters. The tubular bodies are assembled into a larger transfer group and jointly transferred to a turn table including a corresponding number of mandrels. The turn table conveys them jointly and stepwise to stations for fitting the shoulder portion with a threaded neck and the closure cap. The finished tubes are deposited on a discharge belt and fed to control regions for checking. Flawless tubes are received by the discharge belt and fed continuously to a tray.

8 Claims, 7 Drawing Sheets

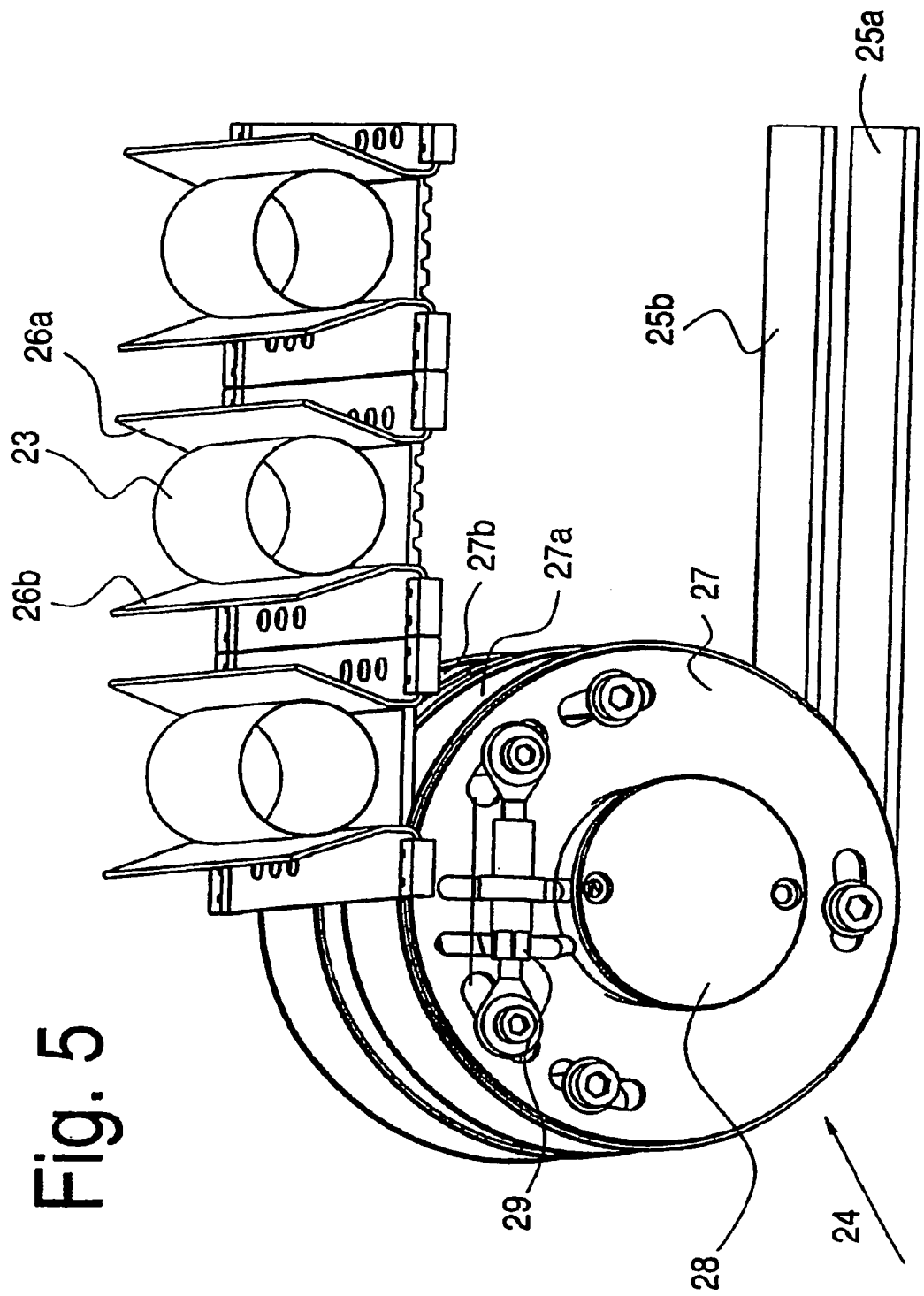

Fig. 6a
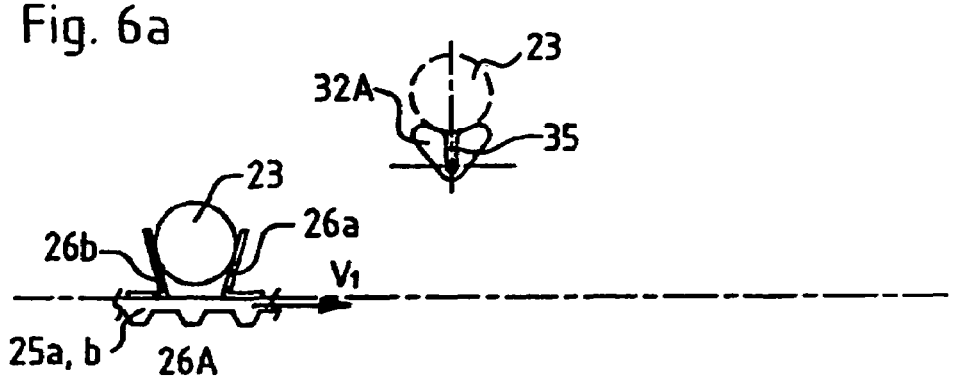
6b
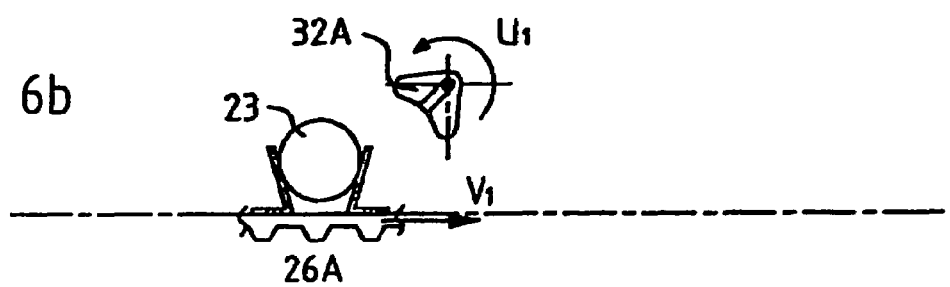
6c
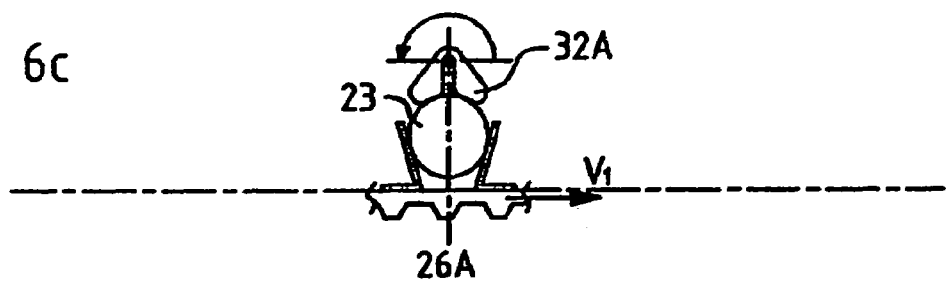
6d
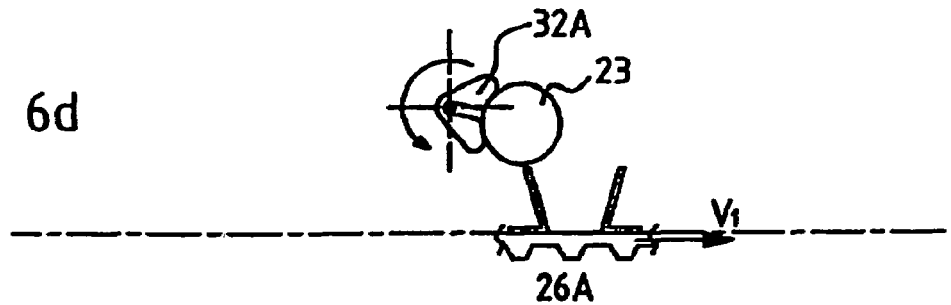
6e
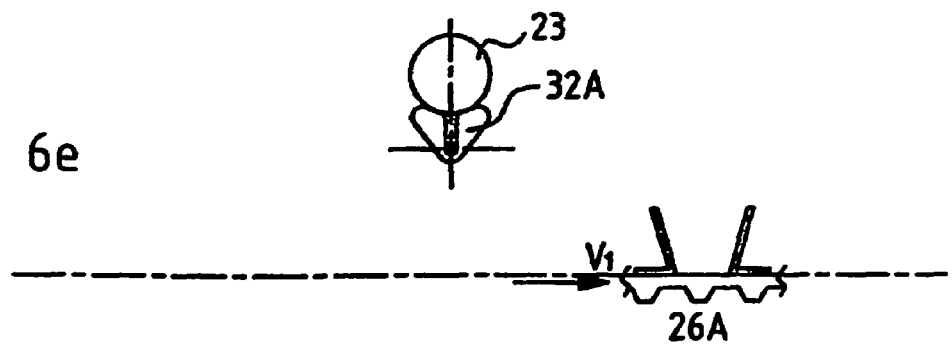

Fig. 7
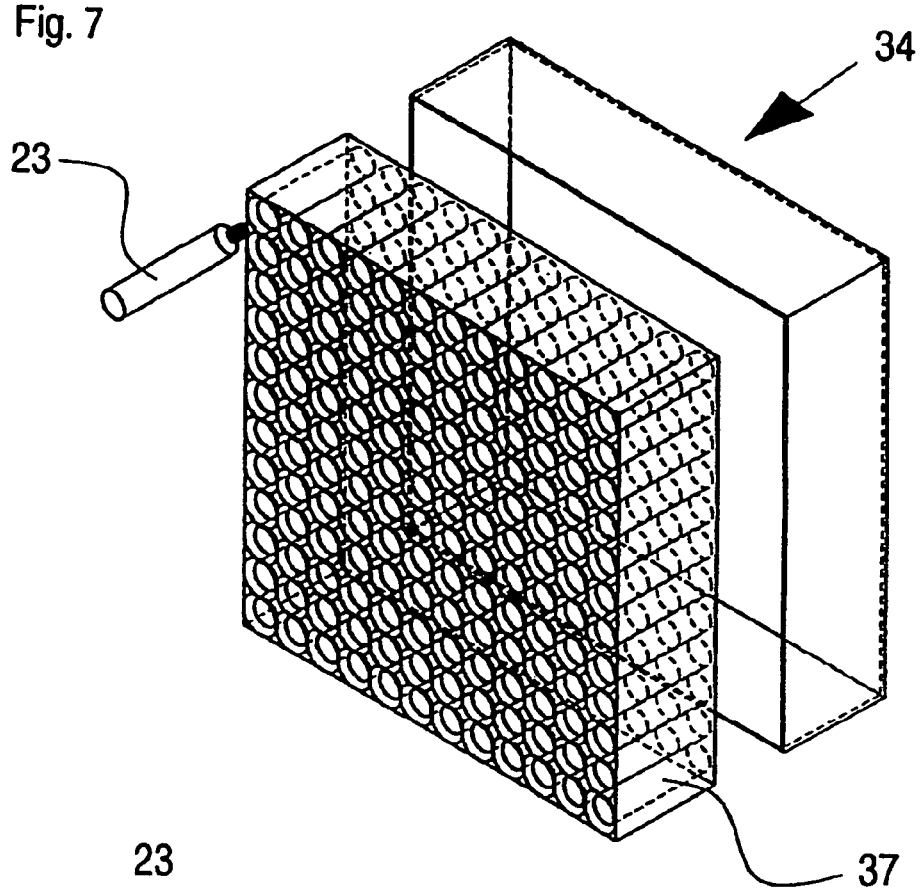
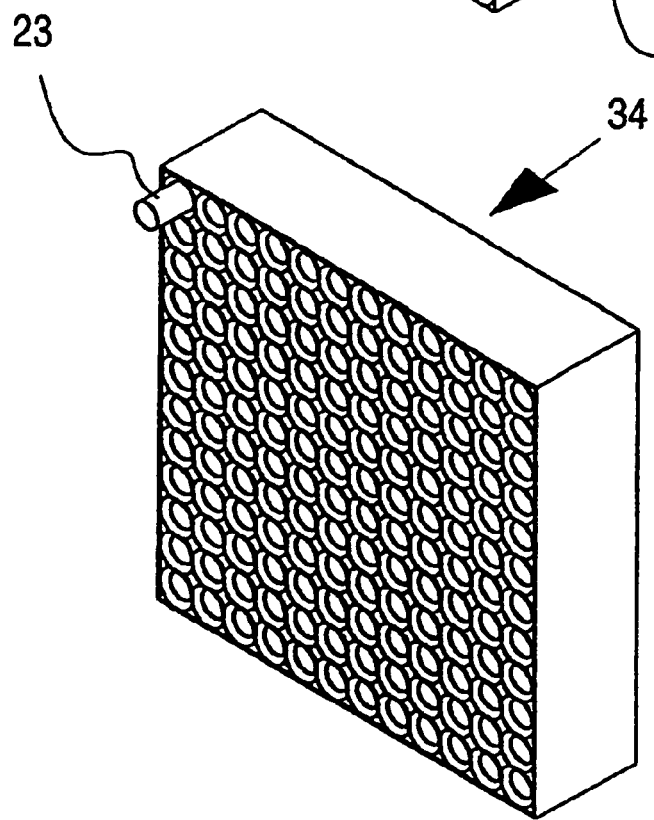

INSTALLATION FOR PRODUCING AND PACKING TUBES

CROSS REFERENCE TO RELATED APPLICATIONS

Applicant claims priority under 35 U.S.C. §119 of German Application No. 102 37 839.8 filed on Aug. 19, 2002. Applicant also claims priority under 35 U.S.C. §365 of PCT/EP2003/008481 filed on Jul. 31, 2003. The international application under PCT article 21 (2) was not published in English.

BACKGROUND OF THE INVENTION

1. Field of the Invention

The invention relates to a plant for manufacturing and packaging tubes consisting of a tubular body consisting of at least one plastic foil and, connected at one end thereof a shoulder portion with a threaded neck, fitted with a closure cap, the tubes being fed via a conveyor belt to a packaging station, where they are packaged to form larger units.

2. Description of the Related Art

This process is normally performed in two stages. In a first step tubular bodies are manufactured from a laminated foil or from an extruded hose, which are fitted with a shoulder portion comprising a threaded neck and a closure cap. In this case, prior to screwing on the closure means, an originality membrane may be applied to, usually welded onto the withdrawal aperture of the threaded neck. In a second step the tubes manufactured in this manner are then fed, often by means of a conveyor belt, to a packaging machine, where they are packaged to form larger units, and are optionally fed, after further transportation and/or storage, to a filing operation for filling the tubes with a product. After filling, the tubes are closed or sealed at the filling outlet in order to be then once again packaged into larger units for onward transport.

The manufacture and filling of the tubes is performed at a rate of about 80 to 200 tubes/minute, in which context packaging into larger units, in particular in low-wage countries, is performed manually, in which case, at the time of packaging the still empty tubes, visual quality control is performed simultaneously. In particular in countries with high price structures packaging of the still empty tubes, or, as the case may be, even the filled tubes, is done automatically by means of complicated transfer systems—usually into boxes. In this case inspection and/or quality control is performed automatically, which prevents manufactured tubes with defects to be packaged or fed to a filing plant.

During the filling operation the empty tubes are removed from the respective packaging either manually or by gripper means, even multiple grippers and are conveyed to the charging station of a fining machine. From the charging station the tubes normally reach a plurality of stations, e.g. by means of revolving tube holding devices, in which case a filling material is passed through the open end in one station or, optionally, even further stations, each filled tube being closed, e.g. welded, at the filling outlet, causing the filled product to be sealed hermetically in the tube. The filled and sealed tubes are subsequently removed manually or automatically from the filling machine and are optionally passed on to an end consumer in repackaged forum This type of manufacture and packaging provides a certain flexibility at the filling site, but suffers from a number of drawbacks, which are to be seen, on the one hand, in the complicated logistics and transfer technology, in the risk of the packaged, empty tubes collecting dust and dirt, inter alia by frequent contact with the transfer devices, the very often required disposal of the packaging containers used, mainly cardboard boxes, and the required storage, necessitating dead capital on the one hand, and causing increased transport costs on the other.

SUMMARY OF THE INVENTION

It is the object of the invention to provide, on the one hand, plants, which permit, for example, the manufacture of 450-500 tubes/minute having tube diameters e.g. of preferably 22 to 40 mm, or larger or smaller and which permit the arrangement of this quantity of manufactured tubes in reusable, transportable packaging means—even for filling—without having to be repackaged.

This object is attained by a plant for manufacturing and packaging tubes formed of a tubular body including at least one plastic foil and, connected at one end thereof, a shoulder portion with a threaded neck, fitted with a closure cap. The tubes are fed via a conveyor belt to a packaging station, where they are packaged to form larger units. The foil strip is a dual or multiple-strip, cut by one or a plurality of partitioning knives into individual webs, which are in each case welded in parallel planes to form endless tubes and which are cut to the desired tube length by transverse cutters. The tubular bodies manufactured parallel to one another are then assembled into a larger transfer group and are jointly transferred to a turn table comprising a corresponding number of mandrels, the turn table conveying them jointly and stepwise to stations for fitting the shoulder portion with a threaded neck and the closure cap, whereupon the finished tubes are deposited on a discharge belt, formed of at least two toothed belts situated parallel next to one another and comprising transport prisms, the partitioning of which corresponds to that of the mandrels on the turn table, and being fed to control regions for examining the tubes and the flawless tubes being received by the discharge belt by means of rotatable suction prisms corresponding to the spacing of the transport prisms and being fed continuously to a tray.

Advantageous embodiments are discussed below.

BRIEF DESCRIPTION OF THE DRAWINGS

The invention is elucidated in detail in what follows by way of an embodiment of a plant for manufacturing and packaging tubes with reference to the figures. There is shown in:

FIG. 5 a discharge belt made of two co-acting toothed belts;

FIG. 6a-e the transfer of an individual tube;

FIG. 7 tube trays.

DETAILED DESCRIPTION OF PREFERRED EMBODIMENTS

Figure 1:
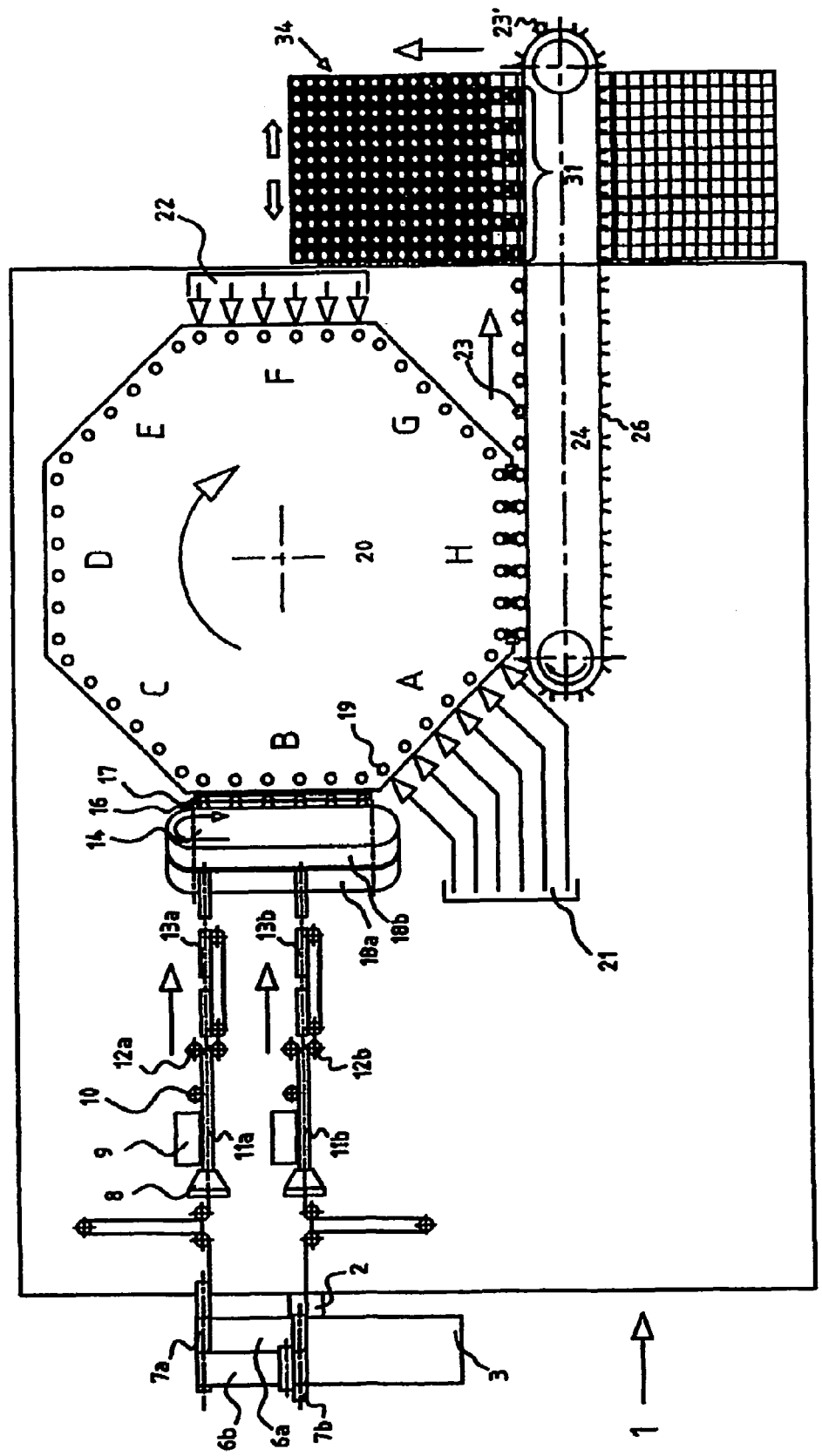
FIG. 1 a plant in longitudinal elevation.
Figure 2:
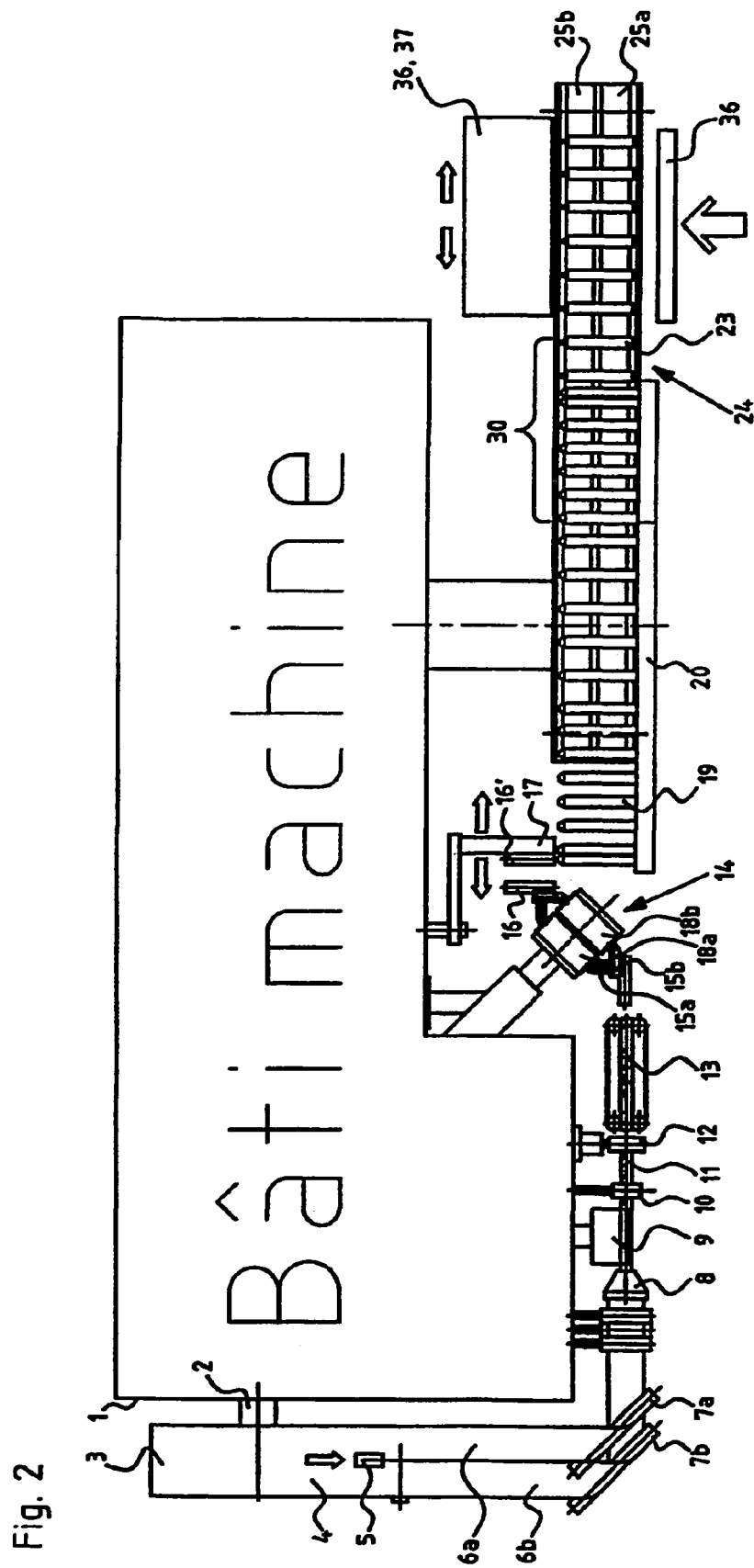
FIG. 2 the plant according to FIG. 1 viewed from the top.
Figure 3:
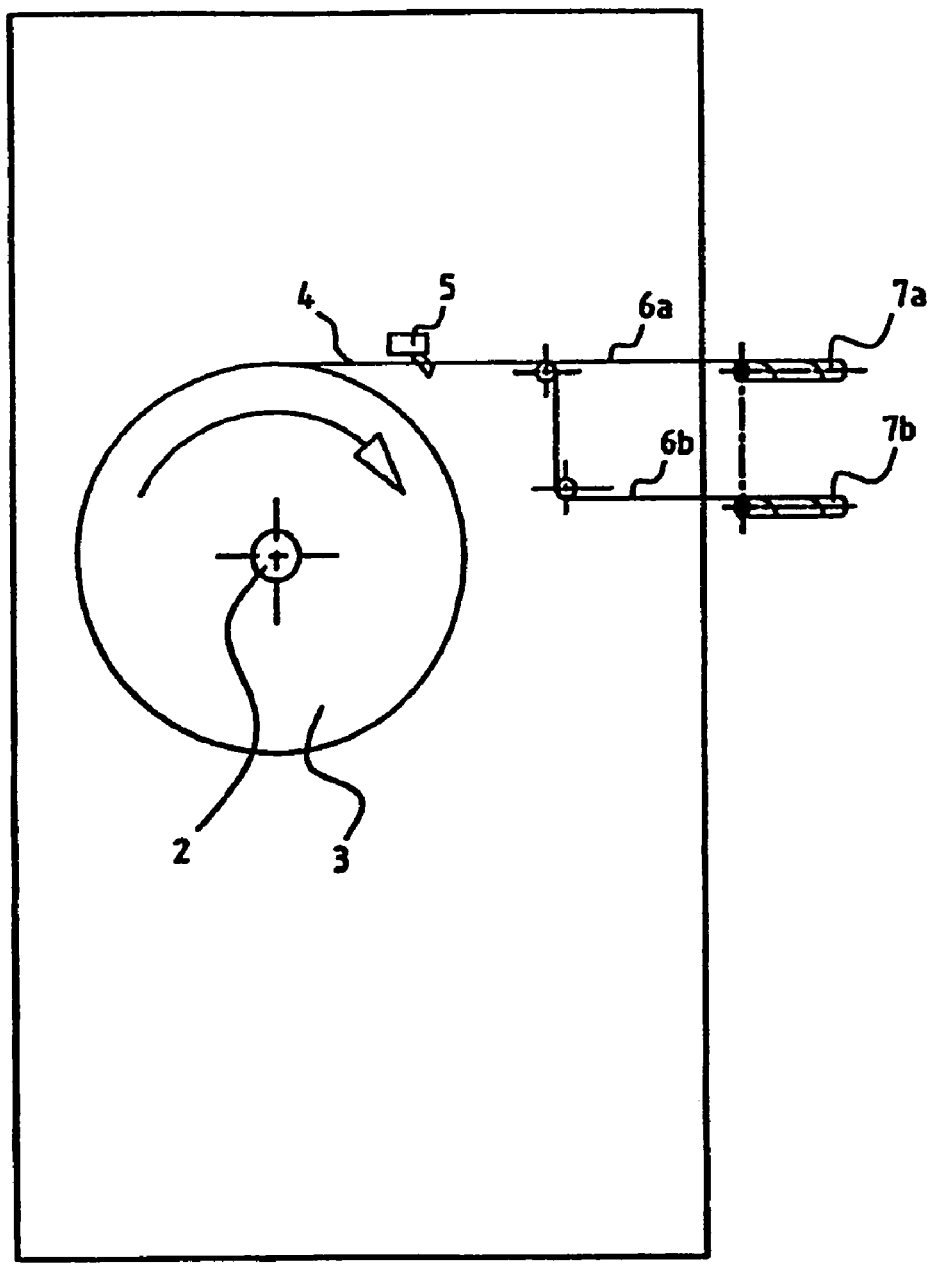
FIG. 3 the plant according to FIG. 1 in cross-section with a double-roll.

FIG. 1 shows the longitudinal side of a plant according to the invention viewed from the side. On its left end face 1 a double roll 3 (see also FIGS. 2 and 3) of a foil strip 4 is arranged on an axis 2 in a rotatable—optionally also driven—manner. As a result of this front end arrangement space is saved in the plant in and on its longitudinal side. A partitioning knife 5 cuts the double-web 3 of the foil strip 4 into two individual webs 6a and 6b. Each individual web 6a, 6b is deflected by a deflecting rod 7a, 7b, optionally with guiding rolls, by 90° on the longitudinal side of the plant. The deflection is performed such that the individual webs 6a, 6b—as shown in FIG. 1—are guided onwards in two superimposed planes. Each individual web 6a, 6b is associated with a moulding bell 8, a welding head 9 as well as pressing and cooling devices 10, by means of which the deformation into a tubular body 11 (endless tubes 11a, 11b) is performed, in which context the provision here of a longitudinal overlap seam, e.g. by welding, may be performed in this case as well.

The foil strip 4 may already comprise print or character images (not shown) and may also be designed as a triple or multiple strip, in which case further partitioning knives 5 and further planes for manufacturing the respectively required number of endless tubes would have to be provided.

According to the desired length of the tubular bodies 11 or of a printed image the endless tubes 11a, 11b are separated by way of transverse cutters 12a, 12b, having e.g. a size control, into tube body sections 13a, 13b having the respectively desired length A transfer device 14 including suction prisms 15, which may be bent around by 45°, takes over two tube body sections 13a, 13b each in a cyclical operation until altogether six tube body sections 13a; 13b are assembled to form a "transfer group".

The transfer device 14 then guides the "transfer group" of six tube body sections 13a, 13b into a transfer position 16, turned by 90°, where they are taken over by a horizontally moving vacuum slide-on holding device 17, i.e. at any one time six tube body sections 13a, 13b are transferred in this process. The transfer device 14 consists of two single transfer belts 18a and 18b operating independently from one another, each comprising six suction prisms 15a, 15b. These single transfer belts 18 are so controlled and driven that a pulse wise receiving of two tube body sections 13a, 13b at a time, in the present case in a cycle of 450/2=225/minute and likewise a pulse-wise releasing, in the present case in a cycle of 450/6=75/minute is ensured and/or possible in the case of six tube body sections 13a, 13b at a time. These two systems operate at a 180° phase shift alternating with each operating side.

Each slide-on holding device 17 performs a linear up-and-down movement, in order e.g. to move the six tube body sections 13a, 13b from the take-over position 16 of the transfer device 14 into a slide-on position 16' congruent (coaxial) in relation to mandrels 19 of a turn table 20. In this context the six tube body sections 13a, 13b each are simultaneously and jointly pushed onto the mandrels 19 by means not shown, e.g. slide-on tappets.

The turn table 20 is so designed as to convey six mandrels 19 at a time in one step or cycle one after the other, to, for example, eight stations A-H (see FIG. 1). The turn table 20 causes the mandrels 19 to be fed in one step, one after the other, to the individual stations A-H comprising devices for assembling, in the present case six, complete tubes. At the stations A-H all respective mandrels 19 are provided with the required components or are acted upon by external tools.

In the embodiment shown, at station A six shoulder portions 21 with a threaded neck are simultaneously fitted onto the free end of the mandrels 19, at station B six tube body sections 13a, 13b are slid over the shoulder portions 21 onto the mandrels 19 by the vacuum created by the slide-on holding device 17, i.e. positioned in relation to another, in the station C the tube shoulders 21 are pre-heated, which in position D are welded onto the tube body sections 13a, 13b by way of HF-induction heating, while in station E membranes (not shown) for safeguarding content originality are stamped onto the discharge outlet in the shoulder portions 21, in which context this station E may, for example, also be used for cooling the welded shoulder portions 21, while in station F the tube closure caps 22 may be screwed on, which may then be readjusted in station G, e.g. to a precise torque of 35 Ncm, whereafter finally in station H the now complete tubes 23 are withdrawn or removed from the mandrels 19 of the turn table 20, in order e.g. to be placed onto continuously-operating discharge belt 24.

The discharge belt 24 shown in FIG. 5 consists of two toothed belts 25a and 25b, toothed on the inside, arranged parallel next to one another and equipped with transport prisms 26. The transport prisms 26 consist of two partial prisms 26a, 26b, jointly fixed on the toothed belts 25a, 25b, serving as transport belts. Each of the two toothed belts 25a, 25b is tensioned and guided through a toothed driving pulley 27a or 27b and a freely mounted deflection pulley (not shown). In this case the driving pulleys 27a and 27b are arranged on a joint drive shaft 28 and by means of an adjusting device 29 are arranged on the drive shaft 28 in a manner to be adjustable in opposite directions in respect of their relative angle or phase position. By adjusting the angle position of the driving pulleys a linear displacement of the two toothed belts 25a, 25b is brought about, making it possible at the same time to optimally adapt all transport prisms 26 in a very simple and time-saving manner to the respective, freely-selected tube diameters. This results in the setting of the geometrical axis of all tubes 23 to be very simple for all tube diameters and always at the same level. The arrangement of the transport prisms 26 corresponds in the present example to the spacing of the mandrels 19, being 95 mm. As in the present example six mandrels 19 are provided, feeding of the shoulder portions 21 and of the tube closure caps 22 is likewise performed six-fold, although other numbers, e.g. four or eight, are likewise possible.

Figure 4:
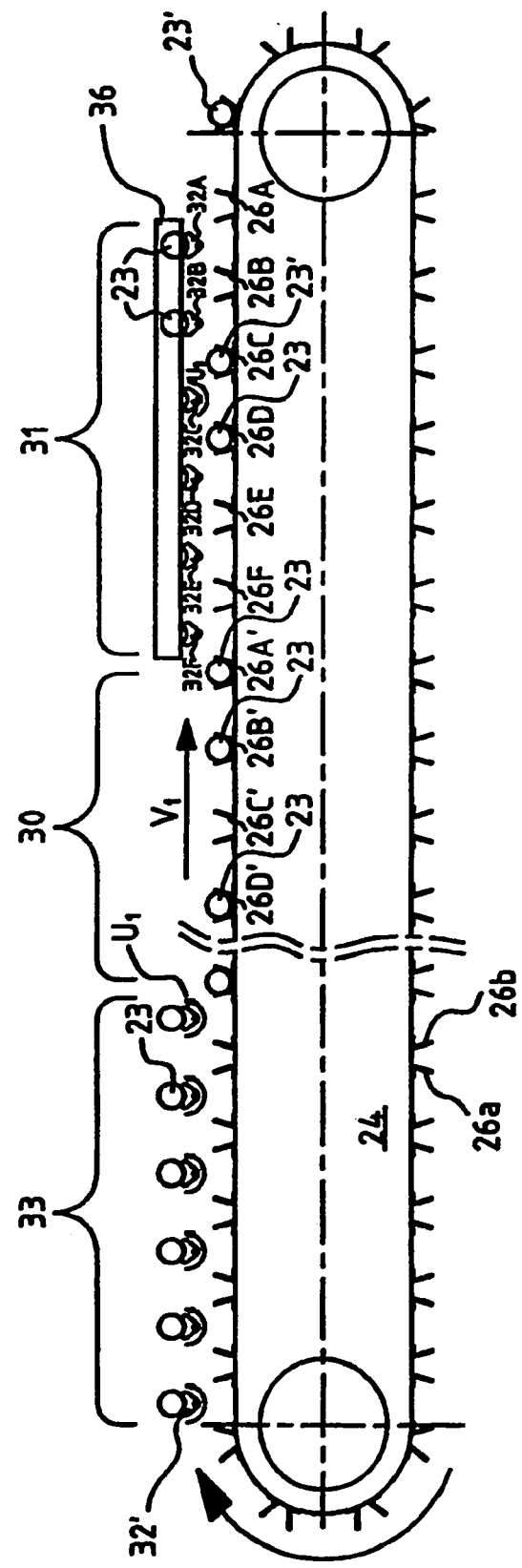
FIG. 4 a schematic representation of a tube collecting device.

On the discharge belt 24 shown in FIG. 4 the tubes 23 may, for example, pass through four different control and discharge zones, situated e.g. in the region 30 along part or all of the length of the upper portion of the discharge belt 24. The four control and discharge zones may, for example, be: a first control for tubes without closure caps; a second control serving as statistical quality control; a third control for unusable reject tubes and a fourth control for good (usable) tubes. During the statistical quality control process sample tubes may be withdrawn automatically at freely selectable time intervals. Reject tubes or defective tubes 23' may be ejected at the end of the discharge belt 24.

At the end of the linear region of the discharge belt 24 a collecting device 31 is arranged comprising e.g. six rotating suction prisms 32 by means of which the good (flawless) tubes 23 may be received continuously, e.g. in trays 34.

This proposed four-way system with the selective ejection of tubes 23 for different uses at different locations along the discharge belt 24 makes it possible, in each case as a function of the respective quality properties or the type of the tubes 23—without any manual intervention—to separate the suitable tubes 23 from the unsuitable tubes 23'.

The six suction prisms 32 in the region 31 (FIG. 4) are arranged in the same spacing relationship as the pure transport prisms 26. By individually controlling the rotary movement of the six suction prisms 32 all tubes 23 fed to the discharge belt 24 may, therefore, be collected continuously according to freely selectable and adjustable criteria, e.g. in such a manner that only absolutely flawless tubes 23 are taken.

A possibility for control presents itself in this context by way of recording the respective process parameters or production parameters, in relation to a tube 23, actually prevailing when passing through the various work stations A to H, each tube 23 transported on the discharge belt 24 subsequently being examined in relation to these parameters. The result may also be accurately assigned to each examined tube 23. As a result, the temporary history file created for each tube 23 serves as control means, all essential production parameters, e.g. in a production data set, being assigned to said history file and defective tubes 23', according to set elimination criteria, being eliminated or monitored at a suitable location. When monitoring, it can be established whether e.g. the welding temperature or the pre-heating was performed at the desired set value or whether it was insufficient. If the predetermined set value was not attained and defective tubes 23' were manufactured as a result thereof, the latter must be eliminated. A missing closure cap 22 on a tube 23 may likewise be detected. Defective or incomplete tubes 23 are removed at a defined location. The described control process ensures that only absolutely flawless tubes 23 are conveyed to the collecting device 31.

The tube transfer from the mandrels 19 of the turn table 20 to the continuously operating discharge belt 24, shown in FIG. 4, is performed in a deposit region 33 or a deposit station for in each case all six—unit forming—mandrels 19 of the turn table 20. They may, e.g. be withdrawn from the mandrels 19 by removal tongues, not shown, and, where applicable, be deposited in transport prisms 26 by a rotatable holding device 32'. A turning motion of the holding device 32' adapted to the advance movement of the discharge belt 24 provides a complete, smooth transfer, in each case all tubes 23 of one unit (in the present case six) being off-loaded and reaching the discharge belt 24.

Selection in terms of the quality of the tubes 23 manufactured according to the above described criteria is only performed in the on-following zone 30 of the discharge belt 24 (see FIG. 4).

In this on-following zone 30 only the flawless tubes 23 are collected, in each case as a unit—in the present case six tubes 23—, by means of a collecting device 31 and only after a complete unit has been obtained, i.e. in the present example six flawless tubes, are they transferred jointly and continuously into special trays 34.

The collecting device 31 comprises six stations with six rotatable holding devices 32A, 32B, 32C, 32D, 32E and 32F including suction prisms. For the sake of simplicity, FIG. 6 shows only one holding device 32A including a suction prism. All holding devices 32 including suction prisms are arranged parallel and above the discharge belt 24. In the respective transfer or take-over position, in relation to the discharge belt 24, each holding device 32 comprises a suction prism with a cavity, directed upwardly in the respective locking or neutral position (see FIG. 6a). If a tube 23, recognised to be usable, approaches the station 32A at rectilinear velocity V1 on the collecting belt 24 in the transport prism 26A, the suction prism of the holding device 32A turns by the peripheral speed U1 and the tube 23, as a result of the suction force applied by the bores 35, is seized by means of the suction prism of the holding device 32A. In orders to ensure a perfect take-over of the tube 23, the peripheral velocity U1 is adapted as closely as possible to the rectilinear velocity V1 or is selected to equal the latter. The bores 35 in the holding device 32, terminating in its cavity, are connected to a suction source, not shown, whereby the tube 23 is removed from the transport prism 26A.

In the momentary state shown in FIG. 4 as an embodiment, the next following good=flawless tube 23 has also been withdrawn from the transport prism 26B at station 32B by the holding device 32B.

If a tube 23', which has been found unusable in terms of the performed selection, approaches in the transport prism 26C the next unoccupied holding device 32C with its suction prism, the holding device 32C does not turn and the defective tube 23' remains on the discharge belt 24 and is ejected or disposed of at its outlet.

If the next tube 23 arriving on the discharge belt 24 in the transport prism 26C is in order, the holding device 32C with its suction prism turns and seizes the tube 23, turning it in upward direction, so that in position 32C a third flawless tube 23 is now present. The same procedure is followed until a fourth flawless tube 23 is obtained from the transport prism 26A' in the following position 32D, then a fifth one from 26b'' in 32E and finally a sixth one from 26D' in 32F, i.e. until six flawless tubes 23 are present in all stations 32A-32F of the collecting device 31. The transport prisms 26E and 26F shown in an unoccupied state pass underneath the collecting device 31 without one of the rotatable holding devices 32 being activated. Thereafter all six tubes 23 arranged in the stations 32A-32F are passed on jointly and, therefore, continuously, to a tray 34, e.g. transferred by a vaguely indicated joint sliding device 36. According to the successive charge, the tray 34 is then shifted in order to receive the next unit of flawless tubes 23. This ensures that automatically only tubes 23 which have been graded as flawless end up in the tray 34.

The collecting device 31 may also serve to "fill in gaps" in any desired tube transport system, e.g. a tube storage system.

The filled tray 34 is conveyed as such to any desired filling station, e.g. via conveyor belts, where the tubes 23 arranged in the tray 34 are filled with a product. It is also possible to perform filling only when the tubes 23 have already been removed from the tray 34. It is obvious that the number of operations required may be clearly reduced by the invention and that they may also be automated, so that manual operation is not required.

The invention claimed is:

1. A plant for producing and packaging tubes, each tube comprising a tubular body including at least a plastic film and a shoulder portion joined at one end with a threaded neck and an attached closure cap, said plant comprising:
    (a) a packaging station;
    (b) a conveyor belt for supplying tubes to the packaging station to package the tubes into larger units;
    (c) at least one blade for cutting a two-ply or multi-ply film strip into individual webs;
    (d) a welding device for welding the individual webs to form endless tubes;
    (e) a plurality of transverse cutters for cutting the endless tubes to a desired tube length to form tubular bodies,
    (f) a transfer device for gathering together a number of the tubular bodies after being cut to the desired tube length to form a larger transfer group;
    (g) a turn table comprising a plurality of stations each having a number of mandrels with a mandrel spacing, the number of mandrels of each station corresponding to the number of the tubular bodies in the transfer group, the tubular bodies in the transfer group being jointly transferred to the turn table by the transfer device;
    (h) the plurality of stations having assembling devices for attaching the shoulder portion of each tubular body with the threaded neck and the closure cap, the turn table conveying the tubular bodies jointly and gradually to the stations for forming finished tubes;
    (i) a withdrawing device for jointly removing the finished tubes from the mandrels;
    (j) a delivery belt comprising first and second toothed belts positioned parallel to each other having transport prisms with a transport prism spacing between transport prisms corresponding to the mandrel spacing of the mandrels on the turn table, the finished tubes being jointly deposited on the delivery belt by the withdrawing device;

(k) a plurality of control regions having control devices for examining the finished tubes delivered by the delivery belt and for selecting flawless tubes and unusable tubes from the finished tubes;

(l) a collection device comprising a plurality of rotatable suction prisms for picking up the flawless tubes; and (m) a tray for receiving flawless tubes carried on the transport prisms continuously fed by the rotatable suction prisms.

2. The plant according to claim 1, further comprising a roll comprising laminated film arranged at right angles to the tubular bodies to be manufactured and a deflector for respectively deflecting the individual webs for forming the tubular bodies by 90°.

3. The plant according to claim 1, wherein the individual webs may be welded one above the other by the welding device to form endless tubes.

4. The plant according to claim 1, wherein the individual webs may be welded next to one another by the welding device to form endless tubes.

5. The plant according to claim 1, further comprising an ejection device for discharging the unusable tubes from the plant.

6. The plant according to claim 1, further comprising an adjustment device for phase-shifting the first and second toothed belts in relation to one another.

7. The plant according to claim 1, further comprising a plurality of trays, wherein each tray has a grid insert adapted to the diameters of the tubes.

8. The plant according to claim 1, wherein the collecting device is arranged at an end of the delivery belt and provided with a plurality of stations.

\* \* \* \* \*

UNITED STATES PATENT AND TRADEMARK OFFICE
CERTIFICATE OF CORRECTION

| | |
|---|---|
| PATENT NO. | : 7,448,187 B2 |
| APPLICATION NO. | : 10/524943 |
| DATED | : November 11, 2008 |
| INVENTOR(S) | : Keller |

Page 1 of 1

It is certified that error appears in the above-identified patent and that said Letters Patent is hereby corrected as shown below:

In particular, in Column 7, line 10 (line 2 of subparagraph (l) in Claim 1), after the word "tubes" please insert the phrase: --carried on the transport prisms-- and delete same phrase from subparagraph (m).

Signed and Sealed this

Twenty-eighth Day of April, 2009

JOHN DOLL
*Acting Director of the United States Patent and Trademark Office*